United States Patent
Ramon

(10) Patent No.: US 9,737,143 B2
(45) Date of Patent: Aug. 22, 2017

(54) RACK PROTECTOR

(71) Applicant: BOPLAN BVBA, Wevelgem (BE)

(72) Inventor: Xavier Ramon, Wevelgem (BE)

(73) Assignee: BOPLAN BVBA, Wevelgem (BE)

( * ) Notice: Subject to any disclaimer, the term of this patent is extended or adjusted under 35 U.S.C. 154(b) by 0 days.

(21) Appl. No.: 15/022,925

(22) PCT Filed: Sep. 18, 2014

(86) PCT No.: PCT/IB2014/064622
§ 371 (c)(1),
(2) Date: Mar. 17, 2016

(87) PCT Pub. No.: WO2015/040563
PCT Pub. Date: Mar. 26, 2015

(65) Prior Publication Data
US 2016/0235202 A1    Aug. 18, 2016

(30) Foreign Application Priority Data
Sep. 18, 2013 (BE) .................... 2013/0620

(51) Int. Cl.
*A47B 95/00* (2006.01)
*A47B 95/04* (2006.01)
*B65G 1/02* (2006.01)
*A47B 96/00* (2006.01)

(52) U.S. Cl.
CPC ............ *A47B 95/043* (2013.01); *A47B 96/00* (2013.01); *B65G 1/02* (2013.01); *B65G 2207/40* (2013.01)

(58) Field of Classification Search
CPC ........ A47B 95/043; A47B 96/00; B65G 1/02; B65G 2207/40

USPC ....................................... 248/345.1
See application file for complete search history.

(56) References Cited

U.S. PATENT DOCUMENTS

| 7,770,861 | B2* | 8/2010 | Huxtable | A47B 95/043 |
| | | | | 248/345.1 |
| 8,267,262 | B2* | 9/2012 | Thelwell | B65G 1/02 |
| | | | | 211/183 |
| 9,414,677 | B2* | 8/2016 | Sahm, III | A47B 95/043 |

(Continued)

FOREIGN PATENT DOCUMENTS

| AU | EP 1 689 659 A1 | 8/2006 |
| AU | WO 2009/076707 A1 | 6/2009 |
| GB | EP 1 738 030 A1 | 1/2007 |

OTHER PUBLICATIONS

International Search Report dated Jan. 12, 2015.

*Primary Examiner* — Anita M King
(74) *Attorney, Agent, or Firm* — Symbus Law Group, LLC; Clifford D. Hyra

(57) ABSTRACT

A protection device (1) or protecting a rack system against impact, comprising an outer shell (2) which is configured to be fitted on an upright column of a rack system, and an inner element (3) which is provided in the outer shell (2) and is made of a flexible material and which, in use, is arranged against or adjacent to a part of the column, in which the inner element (3) is hingeably connected to the inner periphery of the outer shell (2) by its longitudinal ends (6), so that the inner element (3) bends in the direction of the outer shell (2) upon impact so that this outer shell (2) is clamped more securely to the column onto which this outer shell (2) is fitted.

17 Claims, 3 Drawing Sheets

(56) References Cited

U.S. PATENT DOCUMENTS

| | | | |
|---|---|---|---|
| 2004/0234333 A1* | 11/2004 | Hinojosa | E01F 15/0469 |
| | | | 404/6 |
| 2008/0029676 A1* | 2/2008 | Huxtable | A47B 95/043 |
| | | | 248/345.1 |
| 2008/0240853 A1 | 10/2008 | Tarazona de La Asuncion | |
| 2014/0196997 A1* | 7/2014 | Michael | E01F 15/141 |
| | | | 188/377 |
| 2014/0197295 A1* | 7/2014 | Sahm, III | A47B 95/043 |
| | | | 248/345.1 |
| 2016/0227928 A1* | 8/2016 | Smith | A47B 95/043 |

\* cited by examiner

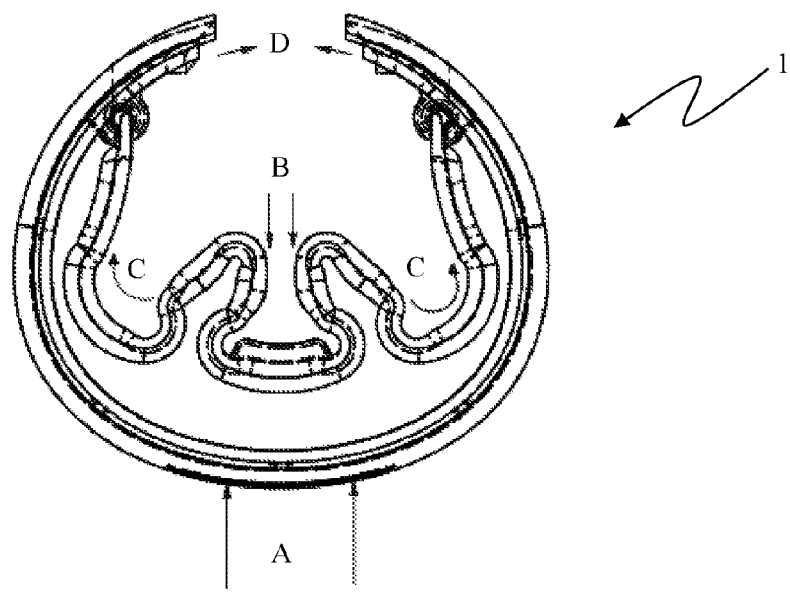
Fig. 8
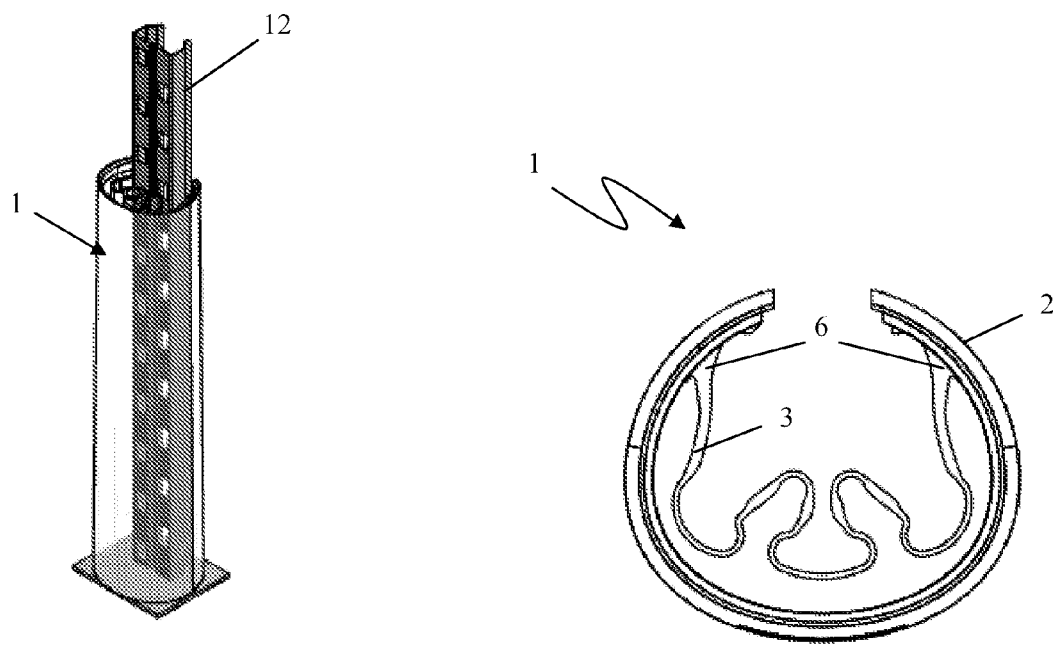
Fig. 9
Fig. 10

RACK PROTECTOR

This application claims the benefit of Belgian patent Application No. 2013/0620, filed Sep. 18, 2013, which is hereby incorporated by reference in its entirety.

FIELD OF THE INVENTION

The present invention relates to a protection device for protecting a rack system against impact, comprising an outer shell which is configured to be fitted on an upright column of a rack system, and an inner element which is provided in the outer shell and is made of a flexible material and which, in use, is arranged against or adjacent to a part of the column. The protection device according to the present invention is particularly suitable for offering optimum protection for stacking racks.

BACKGROUND

When forklift trucks, for example, collide with stacking racks in storehouses and the like, this may have far-reaching consequences. Almost in all cases, this results in very high material costs due to the racks collapsing, in many cases aggravated by an uncontrollable domino effects. In addition, this almost always leads to life-threatening situations for the forklift driver or for others who are present in the building. However, such a scenario can easily be prevented by installing a protection device.

Various such protection devices are already known. These devices normally comprise, on the one hand, an outer shell which is configured to be fitted on a column of a rack and, on the other hand, an inner element which, in use, bears against a part of the column. European patent EP 1 689 659 describes a protection device of such constructions According to this patent, the flat inner element, whose ends are connected to the outer shell by means of a first and second connecting means, respectively, and the outer shell are fixedly connected to each other by means of a number of elastic supporting spokes, as a result of which the forces will be dissipated upon impact by bending of the elastic supporting spokes.

Another protection device is described in European patent publication EP 1 738 030. In order to absorb the forces resulting from an impact, the device described therein is provided with a solid inner lining which can be fixedly connected to the outer shell or is displaceably arranged in this outer shell.

In case of an impact, the forces generated by an impact are mainly absorbed and dissipated by the inner element with the above-described protection devices. Nothing more will happen. With such protection devices, there is also the risk that they become detached from the column to which they are fitted in case of severe impact.

SUMMARY

However, it is the object of the present invention to provide a protection device Which will us the forces which are generated during impact in order thus to improve the clamping effect of the protection device on the rack system.

The object of the invention is achieved by providing a protection device for protecting a rack system against impact, comprising an outer shell which is configured to be fitted on an upright column of a rack system, and an inner element which is provided in the outer shell and is made of a flexible material and which, in use, is arranged against or adjacent to a part of the column, in which the inner element hingeably connected to the inner periphery of the outer shell by its longitudinal ends, so that the inner element bends in the direction of the outer shell upon impact. Preferably, the inner element is only hingeably connected to the inner periphery of the outer shell by means of its longitudinal ends. The inner element is provided in such a way that it ill ensure that the upright edges of the outer shell will move towards each other upon impact, thus resulting in an improved clamping effect.

In the case of the present invention, it is important that the inner element is hingeable with respect to the outer shell. Due to the fact that the inner element is configured to be hingeable, the inner element will develop a counterforce upon impact which will ensure that the upright edges of the outer shell will move towards each other, as a result of which the outer shell is clamped more securely to the column onto which this outer shell is fitted.

The hinged inner element can be achieved by means of a first embodiment, in which the inner periphery of the outer shell comprises guide means in which the inner element is arranged so as to be displaceable and hingeable and in which said inner element is arranged in such a way that the inner element bends in the direction of the outer shell upon impact. The inner element is provided in such a way that it will ensure that the upright edges of the outer shell will move towards each other upon impact, thus resulting in an improved clamping effect.

The guide means of the outer shell of a protection device according to the present invention preferably comprise a first and a second guide duct, in which the inner element with its respective longitudinal ends is arranged so as to be displaceable.

Such first and second guide ducts are in this case preferably arranged at a distance from the respective longitudinal ends of the outer shell.

The longitudinal ends of the inner element of such a protection device having a first and a second guide duct as guide means of the outer shell are preferably thickened. Preferably, each of the guide ducts is configured as a groove which has a shape which corresponds to the respective thickening, so that the longitudinal ends of the inner element can engage in the respective guide duct in order to achieve a strong (displaceable and hingeable) connection between the outer shell and the inner element. In particular, the guide ducts are provided on one side with a locking element, as a result of which the inner element cannot slide out of the outer shell on the respective side.

The hinged inner element can also be achieved by means of a second embodiment, in which the longitudinal ends of the inner element are fixedly hingedly connected to the inner periphery of the outer shell, This may, for example, be effected by means of a film hinge. The longitudinal ends of the inner element are also thickened in this embodiment.

The protection device according to the present invention is provided to be fitted on an upright column of a rack system. This will also be the most common application for such a protection device. Obviously, this protection device may also be useful in protecting beams or columns which are arranged in a different direction than the vertical direction against impact. However, below, the use of a protection device according to the present invention will always involve upright columns.

The outer shell of a protection device according to the present invention is preferably formed in such a way that it can be clamped around the upright column, so that this outer shell, in use, is attached to this column in a self-attaching manner, so that no additional attachment means are required to attach the outer shell to the column and so that, in use, the inner element is kept between the outer shell and the column. To this end, the outer shell of such a protection device is preferably C-shaped, viewed in cross section.

In the uninstalled position of the outer shell, this C shape preferably extends over an angle of between 300° and 340°, so that, in use, the longitudinal ends (upright edges) of the outer shell are clamped to the column. The height of such an outer shell is preferably chosen to be somewhere between 30 and 120 cm. The outer diameter is preferably between 10 and 15 cm. The wall thickness is preferably between 3 and 12 mm.

In the embodiment comprising guide means, the inner element and the outer shell are preferably displaceable with respect to each other in a direction according to the central axis of the outer shell (in the case of an outer shell with a C-shaped cross section, the axis through the centre of the C-shaped cross sections).

The outer shell is preferably made from resilient material which is based on an elastomer polymer material. It may be made, for example from polyethylene, high-density polyethylene polypropylene, polycarbonate, polyvinyl chloride, polystyrene, plastic, a mixture of different plastics, etc. The inner element is preferably made from a similarly flexible material as that of the outer shell.

The outer shell and the inner element are preferably made by means of injection-moulding or by means of extrusion. If the inner element is fixedly connected to the outer shell, the rack protector may also be produced in one extrusion step.

Between the outer shell and the inner element, there is preferably an air gap, both in use and in the rest position.

In particular, the height of the inner element is smaller than the height of the outer shell. This offers the advantage that, depending on the positioning of the inner element with respect to the outer shell, a space can be provided at the bottom and/or the top in which the inner element is not present and can thus not form an obstruction for other components, such as for example fastening bolts.

Preferably, the inner element of a protection device according to the present invention only touches the outer shell at the location of its longitudinal ends in the rest position.

In case of an impact, the inner element will initially move in the direction of the outer shell and as a result of this movement the upright edges of the outer shell will also move towards each other, as described above. In principle, in case of a minor impact, the inner element will never move so far that it comes to lie against the outer shell. However, this will happen in case of a major impact, as a result of which the inner element comes to lie against the outer shell in such cases, resulting in a double wall as it were, which will provide additional protection for the rack system, so that the column to which the protection device is attached moves as little as possible and suffers as little damage as possible.

Between its longitudinal ends viewed in cross section, the inner element of a protection device according to the present invention furthermore preferably follows a bent curve, with this bent curve comprising one or more bends. Due to the one or more bends, the distance between the outer shell and the column will be bridged further when the outer shell touches the inner element in case of (major) impact by means of bent pieces of the inner element. The load which can thus reach the column is further minimized by means of these bent pieces.

In this case, these one or more bends preferably comprise a mushroom head-shaped widening which faces the outer shell. The inner shell may in this case be alveolar or meander-shaped. With such a mushroom head-shaped widening, the contact area between the outer shell and the inner element will be relatively large in the case of a (major) impact. Thus, large zones are created for absorbing and transmitting the forces which occur.

Preferably, the inner element furthermore comprises a plurality of said bends, so that the inner element can also easily be adapted to columns of different widths. This makes it possible to attach the protection device according to the invention to columns of different widths, which was not possible in the case of the above-described systems. Thus, the protection device according to the invention can be applied universally.

In a particular embodiment of a protection device according to the present invention, the inner element comprises zones having different thicknesses. The thicknesses of these zones are preferably chosen based on the desired deformation of the inner element in order to absorb the forces acting thereon as efficiently as possible. In addition, these (flexible) zones in the inner element contribute to the hinge action of the inner element. In a preferred embodiment, the relatively thick parts will have a thickness of between 3 to 6 mm and the relatively thin part will have a thickness of between 2 to 5 mm.

If such an inner element with zones of different thicknesses comprises one or more of said bends with a mushroom head-shaped widening, each mushroom head-shaped widening is preferably thinner than the adjoining zones of the inner element. Upon impact, these zones will deform first when the outer shell touches the inner element in order thus to further increase the contact area between the outer shell and the inner element in order to transmit the occurring forces in an optimum manner.

Furthermore, with inner elements having zones of different thicknesses, zones which, in use, adjoin the column are preferably thinner than the adjoining zones of the inner element. Upon impact, these thinner zones will therefore deform sooner than the adjoining zones of the inner element, so that the contact area between the inner element and the column becomes as large as possible in order to transmit the occurring forces in an optimum manner.

Due to the hinging action of the inner element, the inner element will deform and fold at the location of the relatively thin zones upon impact, as a result of which a force drawing the longitudinal ends of the inner element towards each other will occur. If the inner element is attached to the outer shell by these longitudinal ends, the longitudinal ends of the outer element will also be pulled towards each other, as a result of which the outer shell will not detach from a column to which it is fitted in case of impact, but will, on the contrary, be pulled more tightly against this column by its longitudinal ends.

In a specific embodiment of a protection device according to the present invention, the inner element and the outer shell are transparent. As a result thereof the state of the inner element and the column can be inspected in a simple manner during use, so that, in case of damage, this damage is quickly detected and the inner element (if this is displaceable, a guide means) can be replaced, if necessary. In addition, it is no longer necessary to remove and return all the protection devices during the annual (obligatory) inspection of the rack systems.

More specifically, a protection device according to the present invention may furthermore comprise a compressible (shock-absorbing) element which, in use, is provided between the outer shell and the inner element.

This compressible element is preferably configured as a foam element. This compressible element is preferably made from a material which has an even smaller density than the material of the inner element. This may be made, for example, from polyethylene, polypropylene, polycarbonate, polyvinyl chloride, polystyrene, a natural foam rubber or a synthetic foam rubber, compressible composite, closed-cell styrene butadiene foam rubber, etc.

Preferably, this compressible element does not extend across the entire space between the outer shell and the inner element, but extends, in use, at a distance from the longitudinal ends of the inner element.

If the inner element follows a bent curve, the compressible element preferably comprises a surface which at least partly follows the corresponding bent curve, so that the compressible element adjoins the inner element as closely as possible.

The protection device according to the invention is preferably conical. In this case, the diameter will, in use, gradually increase from the top downwards.

In addition, the protection devices according to the present invention are perfectly stackable. To this end, the inner side of outer shell is provided with a number of reinforcing ribs at the location of the underside, which reinforcing, ribs will rest, when stacked, on the top edge of a protection device which is provided underneath.

In order to further explain, and indicate these and other properties of the present invention, a more detailed description of the device according to the invention will now be given. It will be clear that nothing in the following description can be interpreted as a limitation of the protection for the present invention which is defined in the claims.

BRIEF DESCRIPTION OF THE DRAWINGS

In this description, reference numerals are used to refer to the attached drawings, in which:

FIG. 8 diagrammatically shows what will happen in case of an impact on the protection device according to the invention;

FIG. 9 shows an illustration of a protection device according to the invention in the fitted state on a column which forms part, for example, of a rack system;

FIG. 10 shows a perspective view of a protection device according to the present invention according to a second embodiment.

DETAILED DESCRIPTION

Figure 1:
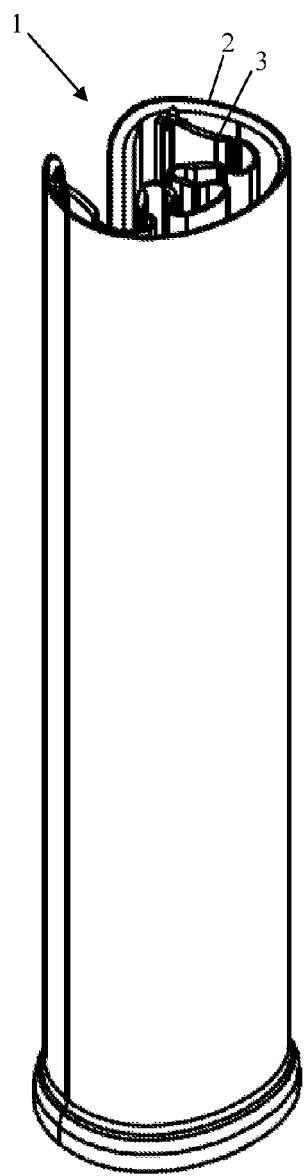
FIG. 1 shows a perspective view of a protection device according to the present invention according to a first embodiment.

The protection device (1) for protecting a rack system or a similar structure according to the present invention and as illustrated in the attached figures comprises an outer shell (2) configured to be fitted (clamped) to an upright column (12) of a rack system and an inner element (3) which is hingeably connected to this outer shell (2). The outer shell (2) (see inter alia FIG. 2) is made from plastic, such as for example PE or PP, and has a C-shaped cross section.

In order to realize the hingeable connection between the inner element (3) and the inner periphery of the outer shell (2), the outer shell (2) of the protection device (1) comprises, according to a first embodiment, on its inner periphery at a distance from its upright longitudinal edges (longitudinal ends (9)), a first and a second guide duet (5) which are configured to accommodate the inner element (3) so as to be displaceable and hingeable. In order to prevent the inner element (3) from readily sliding out of the outer shell (2), each guide duct may be provided with at least one locking element.

Another possibility to realise the hingeable connection between the inner element (3) and the inner periphery of the outer shell (2) is illustrated in FIG. 10. In this second embodiment of the protection device (1) according to the invention, the longitudinal ends (6) of the inner element (3) are fixedly hingedly connected to the inner periphery of the outer shell. This embodiment has the advantage, inter alia, that the protection device, in particular the outer shell (2) and the inner element (3) which is fixedly connected thereto can be formed in one part by means of, for example, an extrusion process.

Between its longitudinal ends (9) and the first and the second guide duct (5) or the location where the longitudinal end (6) of the inner element (3) is connected to the outer shell (2), the outer shell (2) is in each case provided with a lip (14) in order to achieve maximum grip on a column (12) when this outer shell (2) is clamped around this column. In order to facilitate fitting the outer shell (2) around a column (12), the top corners (10) of the outer shell (2) are rounded.

Figure 2:
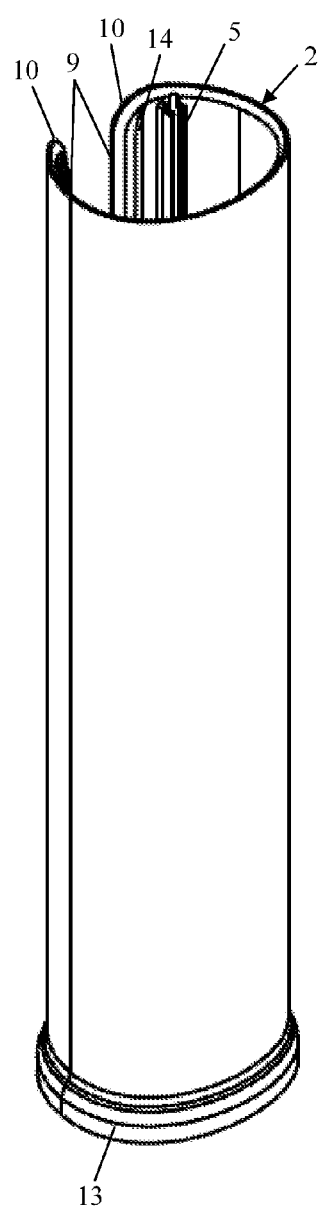
FIG. 2 shows a perspective view of the outer shell of the protection device illustrated in FIG. 1.
Figure 3:
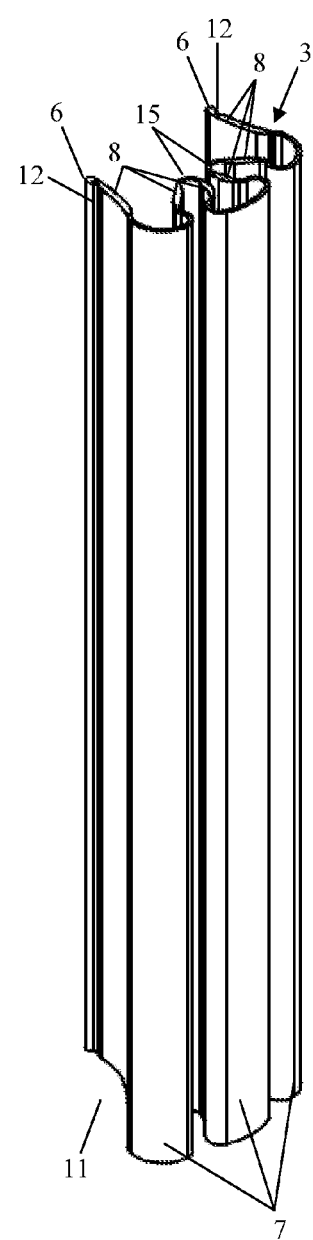
FIG. 3 shows a perspective view of the inner element of the protection device illustrated in FIG. 1.
Figure 4:
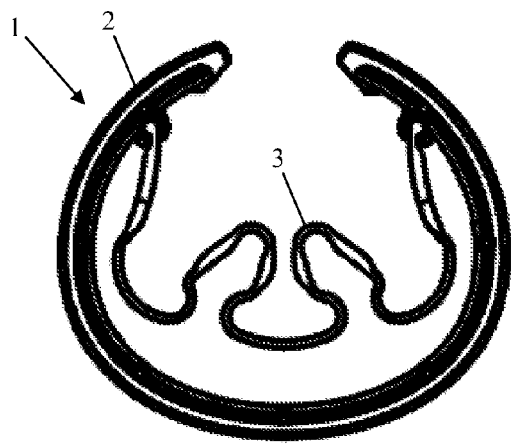
FIG. 4 shows a top view of the protection device from FIG. 1.
Figure 5:
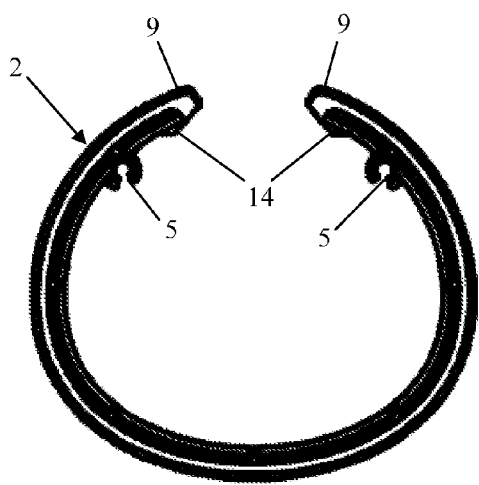
FIG. 5 shows a top view of only the outer shell of the protection device from FIG. 1.
Figure 6:
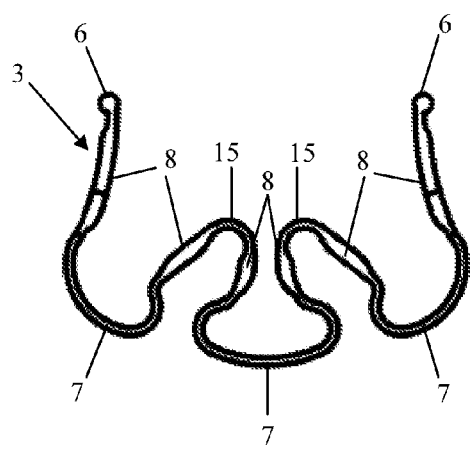
FIG. 6 shows a top view of the inner element of the protection device from FIG. 1.

As can be seen in FIGS. 1 and 2 the underside of the outer shell (2) may be deflected outwards, as a result of which a stacking edge (13) is formed, as it were. Thus, it is possible to stack different protection devices (1) on top of each other, in which case the bottom edge of the top outer shell (2) overlaps the top edge of the outer shell (2) situated underneath. If such a protection device (1) is fitted over as column which is fitted to a floor at the bottom by means of bolts, this bottom edge (13) may also extend over these bolts. However, the underside of the device may also be flat (see FIG. 9). In order to be able to stack devices which are configured in this way, the inner periphery of the outer shell (2) is provided with a number of reinforcing ribs at the location of the underside, which reinforcing ribs will, when stacked, rest on the top edge of a protection device which is situated underneath.

The inner element (3) which is either fixedly connected to the outer shell (2) by its longitudinal ends (6) or can be arranged so as to be displaceable in the first and the second guide duct (5) of the outer shell (2) and is in this case displaceable in a direction along the axis through the centre of the C-shaped cross sections is preferably made from the same material as the outer shell (2), but this is not mandatory.

When the outer shell (2) has been fitted to the column, the inner element (3) extends in the space between the column and the outer shell (2), wherein it touches the outer shell (2) only at the location of its longitudinal ends (6).

The longitudinal ends (6) of the inner element (3) are thickened and, in the first embodiment, have a shape which corresponds to the shape of the cavity of the guide ducts (5), so that the thickened longitudinal ends (6) can be pushed into the guide ducts (5) while retaining their shape. However, a certain degree of play is possible. The longitudinal ends (6) of the inner element (3) are also thickened in the second embodiment.

When viewed in cross section, the inner element (3) follows a bent pad comprising various bends between the longitudinal ends (6) of the inner element (3), resulting in a meander-shaped inner element (3). These bends comprise three mushroom head-shaped widenings (7) which face the outer shell (2) and are thinner than the adjoining parts (8) of the inner element (3). The bent parts (15) of the inner element (3) facing the column are also thinner than the adjoining parts (8) of the inner element (3).

Figure 7:
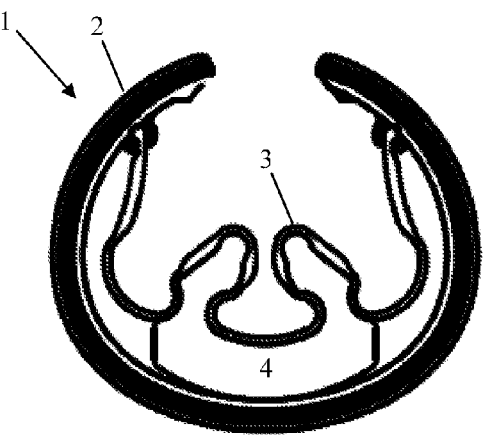
FIG. 7 shows an illustration of a protection device according to the present invention provided with a foam element between the outer shell and the inner element.

If a (shock-absorbing) foam element (4) is displaceably arranged between the inner element (3) and the outer shell (2), as is illustrated in FIG. 7, then it preferably adjoins this inner element (3) and the outer shell (2) in a form-fitting manner, in which case an air gap is retained on either side between the inner element (3) and the outer shell (2). This foam element (4) is preferably displaceable both with respect to the inner element (3) and with respect to the outer shell (3) in a direction along the axis through the centre of the C-shaped cross sections of the outer shell (2).

Due to its construction, and as is evident from FIG. 8 and the following description, the protection device (1) according to the present invention may use the forces which are generated during an impact in order to increase the clamping effect of the protection device the rack system.

When an impact of a certain force, for example according to the direction indicated by arrow A, occurs on the protection device (1), the inner element (3) will develop a counterforce (according to arrow B) which, due to the hinging action of the inner element (3), will ensure that this inner element will deform and fold at the location of the zones which are relatively thin, as a result of which a force (indicated by C) drawing the outer legs of the inner element (3) towards each other will occur, so that the longitudinal ends (6) of the inner element (3) will also move towards each other. Due to the fact that the inner element (3) is (hingeably) connected to the outer shell (2) by means of these longitudinal ends (6), the longitudinal ends of the outer shell (2) will in this case also be pulled towards each other (indicated by D), as a result of which this outer shell (2) is clamped more securely to the column on which this outer shell (2) is fitted.

In the case of a minor impact, the inner element (3) will, in principle, only move to a limited degree in the direction of the outer shell (2) (according to arrow B). However, in the case of a major impact, the inner element (2) may fold in such a manner that its mushroom head-shaped widenings (7) come to lie against the wall of the outer shell (2), as a result of which a double wall is formed which can absorb loads to the greatest degree.

Another advantage of the protection device according to the invention is the fact that it can be used with different rack systems. With most rack systems which are in use, the (upright) column has a width which, depending on the model, may vary between approximately 55 and 130 mm. The above-described known systems have the drawback that the inner element has to be adapted to the width of the column, as a result of which a different inner element has to be provided for each rack system. However, the protection device according to the invention may be regarded as a universal protection device due to the fact that the inner element (2) adapts to the width of the (upright) column.

The protection device (1) according to the present invention is furthermore preferably conical. However, it is obvious that other embodiments e.g., straight, also fall within the scope of protection.

The invention claimed is:

1. Protection device for protecting a rack system against impact, comprising an outer shell which is configured to be fitted on an upright column of a rack system, and an inner element which is provided in the outer shell and is made of a flexible material and which, in use, is arranged against or adjacent to a part of the column, wherein the inner element is hingeably connected to the inner periphery of the outer shell by its longitudinal ends, so that the inner element develops a counterforce upon impact which ensures that the upright edges of the outer shell move towards each other, as a result of which the outer shell is clamped more securely to the column onto which this outer shell is fitted.

2. Protection device according to claim 1, wherein the inner element is only hingeably connected to the inner periphery of the outer shell by its longitudinal ends.

3. Protection device according to claim 1, wherein the longitudinal ends of the inner element are fixedly hingeably connected to the inner periphery of the outer shell.

4. Protection device according to claim 1, wherein the inner element, in use, only touches the outer shell at the location of its longitudinal ends in the rest position.

5. Protection device according to claim 4, wherein, between its longitudinal ends viewed in cross section, the inner element follows a bent curve, with this bent curve comprising one or more bends.

6. Protection device according to claim 5, characterized in that the one or more bends comprise a mushroom head-shaped widening which faces the outer shell.

7. Protection device according to claim 5, wherein the inner element comprises a plurality of said bends.

8. Protection device according to claim 1, wherein the inner element comprises zones having different thicknesses.

9. Protection device according to claim 8, wherein zones of the inner element which, in use, adjoin the column are thinner than the adjoining zones of the inner element.

10. Protection device according to claim 1, characterized in that the inner element and the outer shell are transparent.

11. Protection device according to claim 1, characterized in that the longitudinal ends of the inner element are thickened.

12. Protection device according to claim 1, characterized in that said protection device comprises a compressible element which, in use, is provided between the outer shell and the inner element.

13. Protection device according to claim 12, wherein the compressible element, in use, extends at a distance from the longitudinal ends of the inner element.

14. Protection device according to claim 1, characterized in that the protection device is conical.

15. Protection device for protecting a rack system against impact, comprising an outer shell which is configured to be fitted on an upright column of a rack system, and an inner element which is provided in the outer shell and is made of a flexible material and which, in use, is arranged against or adjacent to a part of the column, wherein the inner element is hingeably connected to the inner periphery of the outer shell by its longitudinal ends, so that the inner element bends in the direction of the outer shell upon impact, wherein the inner periphery of the outer shell comprises guide means in which the inner element is arranged so as to be displaceable and hingeable, and in that said inner element is arranged in such away that the inner element bends in the direction of the outer shell upon impact.

16. Protection device according to claim 15, characterized in that wherein the guide means of the outer shell comprise a first and a second guide duct in which the inner element with its respective longitudinal ends is arranged so as to be displaceable.

17. Protection device according to claim 16, wherein the first and the second aide duct are arranged at a distance from the respective longitudinal ends of the outer shell.

\* \* \* \* \*